United States Patent [19]
Gorychka et al.

[11] 3,868,050
[45] Feb. 25, 1975

[54] VALVE ASSEMBLY FOR SEMI-FROZEN COMMODITY

[75] Inventors: Carl Gorychka, Beloit, Wis.;
Richard M. Keyes, Rockford, Ill.

[73] Assignee: Beatrice Foods Company, Chicago, Ill.

[22] Filed: Oct. 29, 1973

[21] Appl. No.: 410,901

[52] U.S. Cl. .............................. 222/509, 251/318
[51] Int. Cl. ............................................. B67d 5/06
[58] Field of Search ............ 202/505, 509; 251/231, 251/318, 319

[56] References Cited
UNITED STATES PATENTS

| | | | |
|---|---|---|---|
| 2,001,040 | 5/1935 | Sweeney | 222/509 X |
| 2,549,207 | 4/1951 | Kestenbaum | 222/505 X |
| 3,255,938 | 6/1966 | Dimmich et al. | 222/505 |

Primary Examiner—Robert B. Reeves
Assistant Examiner—Joseph J. Rolla
Attorney, Agent, or Firm—Richard O. Gray, Jr.

[57] ABSTRACT

A valve assembly in a semi-frozen confection machine for dispensing the semi-frozen confection, including: a block member having a first passage communicating with the machine and a second passage inclined relative to and communicating with the first passage and the open atmosphere; and a piston within the first passage, movable between closed and opened positions. In the open position, the piston allows the commodity to transfer from the machine, into the first passage, and into the second passage for dispensing therefrom. In the closed position the piston fills the first passage at the freeze cylinder for deplugging the passage and cutting off flow to the second passage. The second passage is self-draining when the piston is closed and the piston is self-locking in its closed position.

4 Claims, 5 Drawing Figures

3,868,050

VALVE ASSEMBLY FOR SEMI-FROZEN COMMODITY

BACKGROUND OF THE INVENTION

The invention is generally directed to a valve assembly for dispensing fluids. The valve assembly is particularly well adapted for use in semi-frozen confection machines of the type which operate under positive pressure.

Semi-frozen confection machines for making ice cream, frozen custard, ices, and the like, are well known in the art. One form of valve assembly used in the past is a continuously closing orifice communicating with the machine by a horizontally disposed passage. Because the semi-frozen confection is at or very near to its freezing temperature while under pressure, it freezes when exposed to atmospheric pressure. Such freezing causes blockage of the valve due to the fact that means are not provided for the draining and melting of the residual commodity within the valve. Also, in view of the fact that the machine operates under positive pressure, a layer of residual commodity builds up against the closed orifice, additionally adding to valve blockage.

It is an object of the present invention to provide a valve assembly for a semi-frozen commodity confection machine which is self-draining precluding blockage of the valve.

It is a still further object of the present invention to provide a valve assembly for a semi-frozen commodity confection machine which provides a positive shut-off to further cause the valve to remain in an unblocked state.

It is a still further object of the present invention to provide a valve assembly for a semi-frozen commodity confection machine which is self locking in the closed position.

SUMMARY OF THE INVENTION

The invention provides in a semi-frozen commodity confection machine of the type which includes a freezing chamber and which operates under positive pressure, a valve assembly for dispensing a semi-frozen commodity into an ambient temperature and pressure atmosphere comprising a valve block member connected to the freezing chamber, a first passage within the block member for receiving the semi-frozen commodity, a second passage within the block member having first and second ports, the first port communicating with the first passage and the second port adapted for advancing the semi-frozen commodity, a piston within the first passage, and means for moving the piston within the first passage to an open valve position for allowing transfer of the semi-frozen commodity from the first passage to the second passage and to a closed valve position precluding transfer of the commodity from the first passage to the second passage, whereby, when the valve is in the open position the semi-frozen commodity under the positive pressure passes through the first passage into the second passage for dispensing therefrom.

BRIEF DESCRIPTION OF THE DRAWINGS

The features of the present invention which are believed to be novel are set forth with particularity in the appended claims. The invention, together with further objects and advantages thereof, may thus be understood by reference to the following description in conjunction with the accompanying drawings and in the several figures of which like reference numerals indicate identical elements and in which:

DESCRIPTION OF THE PREFERRED EMBODIMENT

Figure 1:
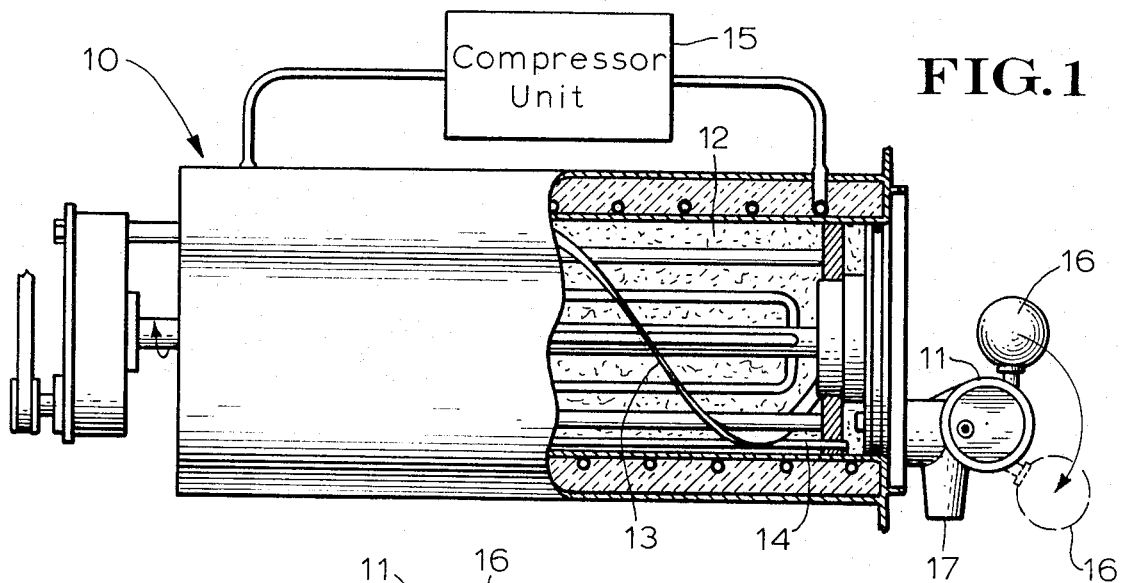
FIG. 1 is a side view, partially in cross section and partly cut away of a semi-frozen commodity confection machine incorporating a valve assembly embodying the present invention.

Referring now to FIG. 1, there is shown a semi-frozen commodity confection machine 10 incorporating a valve assembly 11 embodying the present invention. In the machine 10 the liquid confection is frozen in a freezing cylinder 12 where it is rotatably stirred by a beater comprising helical beater blade 13 and scraper blade 14. The freezing cylinder 12 and helical rotary beater 14 are of a conventional construction known to the art. The freezing cylinder 12 is cooled through a conventional compressor unit 15, illustrated schematically in the drawings.

The beater is preferably co-axially rotatably mounted inside the freezing cylinder 12, the rotation of which moves the scraper blade 14 over the wall of the freezing cylinder 12 and also rotates the helical beater blade 13. The rotation of the helical blade 13 provides a forward movement of the semi-frozen confection commodity and also imparts to the commodity a substantial rotational movement.

Located at the dispensing end of cylinder 12 is valve assembly 11 embodying the present invention. It is connected to the freezing cylinder 12. When control arm 16 is in the position indicated in dash lines in FIG. 1, the valve is in the open position and semi-frozen confection is dispensed at port 27. When the control arm 16 is in the position shown in solid lines in FIG. 1, the valve is in the closed position and nothing is dispensed.

Figure 2:
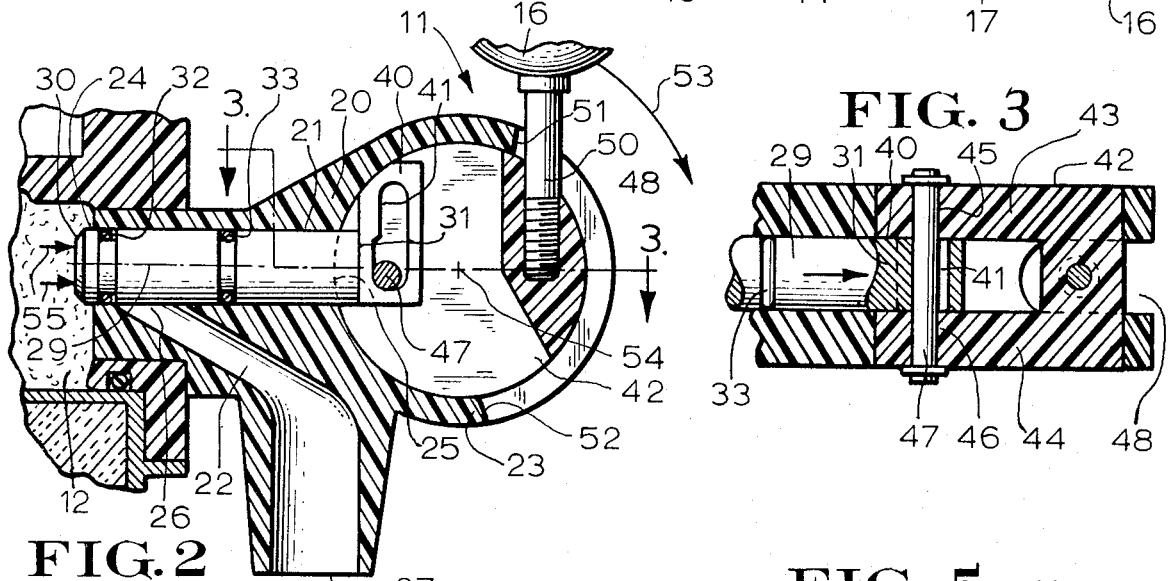
FIG. 2 is a cross sectional side view of the valve assembly embodying the present invention in its closed position.

The valve assembly 11 as shown in greater detail in the cross-sectional view of FIG. 2, comprises a valve block member 20, a piston 29, a bifurcated disc 42 and control arm 16.

The block member 20 includes a first passage 21, a second passage 22, and a ring portion 23. The first passage 21 includes a first port 24 which opens into the freezing chamber 12 and a second port 25 communicating with the inner area of ring portion 23. The second passage 22 has a first port 26 communicating with first passage 21 and a second port 27 adapted for dispensing the semi-frozen commodity into the ambient atmosphere.

Figure 3:
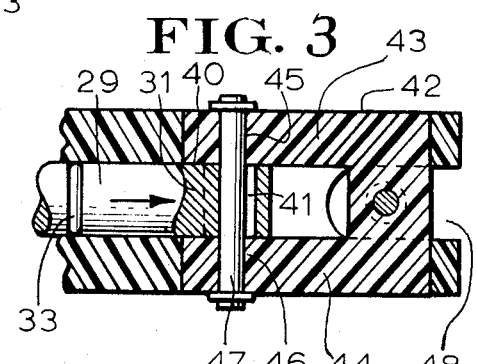
FIG. 3 is a fragmentary cross sectional view taken along line 3—3 of FIG. 2.

Located within the first passage 21 is a cylindrical piston 29 having a first end 30 and a second end 31. O-rings 32 and 33, positioned around piston 29, provide sealing between piston 29 and the inner wall of first passage 21. Connected to the second end 31 of piston 29 is piston block member 40 having an elongated and vertically extending slot 41 therein which is discussed hereinafter. Within the ring portion 23 of the block member 20 is a bifurcated disc 42 having a diameter such that it is free to rotate within the valve block member ring. The bifurcated disc can be more clearly seen in the cross-sectional view of FIG. 3.

Bifurcated disc 42 comprises two arms 43 and 44 each having a slot 45 and 46, respectively. Slots 45 and 46 are aligned with each other and are also aligned with the elongated slot 41 of piston block member 40. The bifurcated disc arms 43 and 44 are positioned such that piston block member 40 is in between them. Slots 45 and 46 are also aligned with elongated slot 41 to allow pin 47 to extend through all three slots. Pin 47 couples rotatable disc 42 to the piston block member 40 such that when piston 42 rotates, pin 47 travels in a circular arc and rides up the elongated slot 41 imparting linear movement to piston 29 within first passage 21.

Figure 4:
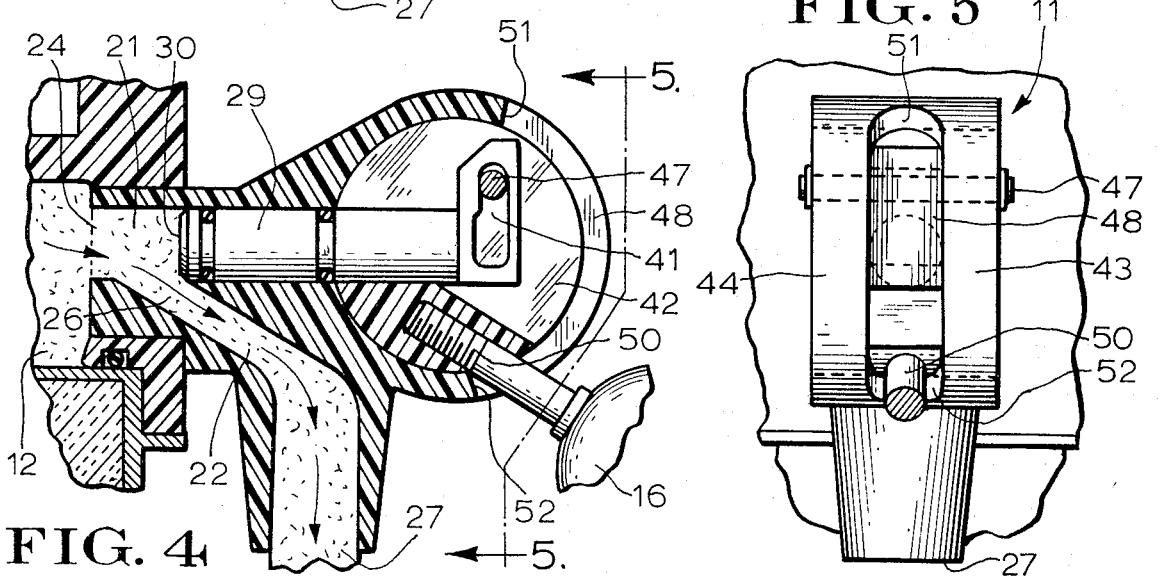
FIG. 4 is a cross-sectional side view of the valve assembly of FIG. 2 in its opened position.

Ring portion 23 has an elongated slot 48 allowing threaded shaft 50 of control arm 16 to be coupled to rotatable disc 42. As shown in FIGS. 2 and 4, slot 48 has a first end 51 and a second end 52, allowing ring slot 48 to define a predetermined arc of rotation of the rotatable disc as control arm 16 is moved in the direction shown by arrow 53.

In operation, FIG. 2 shows the valve assembly 11 is in the closed valve position, with the first end 30 of piston 29 extending into freezing chamber 12. This provides complete clearing of the first passage 21 of semi-frozen commodity precluding blockage of the passage.

In the closed valve position, threaded shaft 50 of control arm 16 abuts end 51 of ring slot 48. As can be noted from FIG. 2, the center of rotation 54 of rotatable disc 42 is located on the center axis of piston 29. The elongated piston block member slot 47, however, extends below the center axis of piston 29, and in the closed valve position, pin 47 is located below the central axis of the piston and the axis of rotation 54 of rotatable disc 42. Due to the positive pressure within the freezing chamber 12, a force is exerted against piston 29 indicated by the arrows 55 which results in a reverse torque being applied against rotatable disc 42. Because threaded shaft 50 abuts slot end 51, the force of the positive pressure exerted against piston 29 maintains the valve 11 in the closed position. Therefore, the valve of the present invention is self-locking.

Because residual commodity may be left in second passage 22 at the end of a dispensing cycle, second passage 22 is inclined relative to the first passage to take advantage of the forces of gravity so that responsive to ambient temperatures semi-frozen commodity is melted and runs down the inclined second passage 22 through the dispensing port 27. Of course, the angle of inclination is not critical, it being important only that the inclination be sufficient to permit a natural flow of liquid. This facilitates self-draining of the valve which further lends to the valve remaining in an unblocked state.

In FIG. 4, the valve is shown in the open position. Disc 42 has been rotated by control arm 16 to the point where threaded shaft 50 of control arm 16 abuts the second end 52 of ring slot 48. In this position, pin 47 is at the upper portion of elongated slot 41 and the piston 29 is pulled to the right exposing the first passage 21 to second passage 22. This allows transfer of the semi-frozen commodity from the freezing chamber 12 through the port 24 of passage 21 and port 56 of passage 22 and through dispensing port 27 of passage 22.

Figure 5:
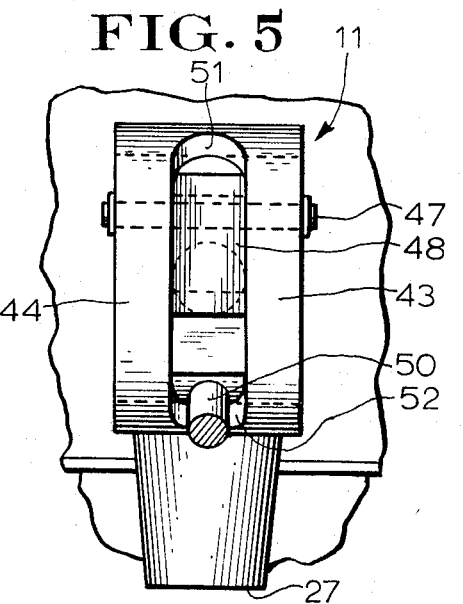
FIG. 5 is a front view taken on line 5—5 of FIG. 4.

During its movement from the closed valve position of FIG. 2 to the open valve position of FIGS. 4 and 5, piston 29 moves linearly through first passage 29 due to the pulling effect of pin 47 traveling in a circular arc. In its preferred form, end portion 30 of piston 29 exposes the entire first port 26 of second passage 22 to first passage 21. The extent of the movement of piston 29 is controlled by the length of slot 48, the movement of piston 29 terminating when threaded shaft 50 abuts end portion 52 of ring slot 48. Therefore, while valve 11 is being opened, it is being opened in a controlled linear motion having a predetermined fully opened position.

While there are advantages to pressurized semi-frozen confection machines one disadvantage is that in a dispensing cycle and with the valve in the open position, the pressurized confection is at approximately, but slightly above its freezing point. As the fluid moves from the freezing chamber to ambient pressure, the confection tends to freeze and fill the passage. Except for the pressure forcing the flow of the confection, the passage would be blocked. When the valve is closed that pressure forcing flow is relieved so that flow stops, and as the temperature of the confection is reduced to below freezing, the residual confection is frozen solid in the passage.

However, in the arrangement of the present invention, all of the residual commodity is pushed from the first passage 21 and into freezing chamber 12 by the piston 29 as it moves from the open to the closed position. The residual commodity in the passage 22 may freeze solid when the valve is closed, but as it is open at the port 27 to ambient temperatures the commodity will be warmed and run from the passage by force of gravity. Thus, the valve assembly of the present invention deplugs the flow passages and is self-draining, thereby precluding blockage of the valve. In addition, the present invention provides a valve assembly which is self-locking when in the closed position.

While a particular embodiment of the invention has been shown and described, modifications may be made, and it is intended in the claims to cover all such modifications as may fall within the true spirit and scope of the invention.

We claim:

1. In a semi-frozen commodity confection machine of the type which operates under positive pressure, a valve assembly for dispensing a semi-frozen commodity comprising:

a block member comprising a first passage having a receiving port communicating with the machine for receiving semi-frozen commodity and a rear port, a second passage having a first port communicating with said first passage and a dispensing port for dispensing the commodity, said second passage being inclined relative to said first passage, and a ring portion having an inner area communicating with said rear port;

a piston movably positioned within said first passage and having first and second ends;

a piston block member coupled to said second end of said piston and having an elongated slot therein;

a bifurcated disc comprising two arms within said ring, said disc being free to rotate therein, and having a slot in each said arm, said slots being aligned with each other;

said piston block member positioned in between said bifurcated disc arms and said block member slot being aligned with said aligned arm slots;

a pin extending through said piston block member slot and said aligned arm slots; and means for rotating said disc to cause said pin to travel in a circular path and ride within said piston block member slot for imparting linear travel to said piston within said first passage between first and second travel positions, said piston being in a closed valve position within said first passage at said first travel position to preclude transfer of the commodity from the machine to said first passage, and in an open valve position at said second travel position to allow the commodity to be transferred under positive pressure from the machine, through said first passage, and through said second passage to be dispensed therefrom whereby, said piston travels linearly within said first passage, and after closing of said valve, the residual frozen commodity within said second passage melts and runs down said inclined passage precluding blockage of said valve.

2. A valve assembly in accordance with claim 1 wherein said ring portion includes a slot, and where said bifurcated disc is coupled to a control arm extending through said slot in said ring portion, said ring slot defining a predetermined are of rotation of said disc wherein said first travel position corresponds to said control arm abutting one end of said ring slot, and where said second travel position corresponds to said lever arm abutting the other said end of said ring slot.

3. A valve assembly in accordance with claim 1 wherein the center of rotation of said disc is located on the central axis of said piston, and where said slot in said piston block member extends below said central axis of said piston, whereby when said piston is in said closed position, the central axis of said pin is positioned relative to the central axis of said piston and said center or rotation of said disc thereby providing a reverse torque to said disc causing said disc to lock in said closed position due to the positive pressure exerting against said piston.

4. A valve assembly in accordance with claim 1 wherein said piston extends through said receiving port and into the machine when in said closed valve position whereby, the extension of said piston into the machine completely clears said first passage of residual commodity precluding blockage of said valve.

* * * * *